(12) United States Patent
Oya et al.

(10) Patent No.: US 9,196,401 B2
(45) Date of Patent: Nov. 24, 2015

(54) INSULATED WIRE HAVING A LAYER CONTAINING BUBBLES, ELECTRICAL EQUIPMENT, AND METHOD OF PRODUCING INSULATED WIRE HAVING A LAYER CONTAINING BUBBLES

(71) Applicants: FURUKAWA ELECTRIC CO., LTD., Tokyo (JP); FURUKAWA MAGNET WIRE CO., LTD., Tokyo (JP)

(72) Inventors: Makoto Oya, Tokyo (JP); Daisuke Muto, Tokyo (JP); Makoto Onodera, Tokyo (JP); Keiichi Tomizawa, Tokyo (JP)

(73) Assignees: FURUKAWA ELECTRIC CO., LTD., Tokyo (JP); FURUKAWA MAGNET WIRE CO., LTD., Tokyo (JP)

(*) Notice: Subject to any disclaimer, the term of this patent is extended or adjusted under 35 U.S.C. 154(b) by 0 days.

(21) Appl. No.: 14/459,722

(22) Filed: Aug. 14, 2014

(65) Prior Publication Data
US 2014/0354394 A1 Dec. 4, 2014

Related U.S. Application Data

(63) Continuation of application No. PCT/JP2013/056169, filed on Mar. 6, 2013.

(30) Foreign Application Priority Data

Mar. 7, 2012 (JP) .................................. 2012-051036

(51) Int. Cl.
*H01B 7/00* (2006.01)
*H01B 17/42* (2006.01)
(Continued)

(52) U.S. Cl.
CPC .............. *H01B 17/42* (2013.01); *B05D 3/0254* (2013.01); *C08G 73/1046* (2013.01);
(Continued)

(58) Field of Classification Search
CPC . H01B 3/00; H01B 3/30; H01B 3/301–3/308; H01B 3/36; H01B 3/38; H01B 3/421–3/42; H01B 7/00; H01B 7/0216; H01B 7/30
USPC ............. 174/110 R, 110 PM, 110 FC, 120 R, 174/120 SR, 121 SR
See application file for complete search history.

(56) References Cited

U.S. PATENT DOCUMENTS 4,000,362 A 12/1976 Kawaguchi et al.
4,104,481 A * 8/1978 Wilkenloh et al. .............. 174/28
(Continued)

FOREIGN PATENT DOCUMENTS

CN 201758030 U 3/2011
EP 1195774 A1 4/2002
(Continued)

OTHER PUBLICATIONS

Chinese Office Action and Search Report for corresponding Chinese Application No. 201380001974.5, dated Jan. 30, 2015, with an English translation.

(Continued)

*Primary Examiner* — William H Mayo, III
(74) *Attorney, Agent, or Firm* — Birch, Stewart, Kolasch & Birch, LLP

(57) ABSTRACT

An insulated wire, containing: an insulating film made from a thermosetting resin disposed on a conductor directly or via an insulating layer interposed therebetween, in which the insulating film made from a thermosetting resin is a layer containing bubbles prepared by baking a varnish of thermosetting resin, and a layer containing no bubbles is formed as an upper or lower layer of the layer containing bubbles.

9 Claims, 2 Drawing Sheets

(51) Int. Cl.

| | | |
|---|---|---|
| *C09D 179/08* | (2006.01) | |
| *C09D 201/00* | (2006.01) | |
| *H01B 13/06* | (2006.01) | |
| *H01B 7/29* | (2006.01) | |
| *C08G 73/10* | (2006.01) | |
| *C08G 73/14* | (2006.01) | |
| *B05D 3/02* | (2006.01) | |
| *H01F 27/28* | (2006.01) | |
| *H01F 5/06* | (2006.01) | |
| *H01B 3/30* | (2006.01) | |

(52) U.S. Cl.
CPC ............ *C08G 73/14* (2013.01); *C09D 179/08* (2013.01); *C09D 201/00* (2013.01); *H01B 3/306* (2013.01); *H01B 7/292* (2013.01); *H01B 13/065* (2013.01); *H01F 27/28* (2013.01); C08L 2205/02 (2013.01); H01B 3/308 (2013.01); H01F 5/06 (2013.01); Y10T 428/2935 (2015.01); Y10T 428/2967 (2015.01); Y10T 428/2969 (2015.01)

(56) References Cited

U.S. PATENT DOCUMENTS

| | | | | |
|---|---|---|---|---|
| 4,473,665 | A * | 9/1984 | Martini-Vvedensky et al. | ................................ 521/79 |
| 4,692,381 | A | 9/1987 | Pecsok | |
| 4,711,811 | A * | 12/1987 | Randa | ........................... 428/383 |
| 5,162,609 | A * | 11/1992 | Adriaenssens et al. | ......... 174/34 |
| 5,358,786 | A * | 10/1994 | Ishikawa et al. | ............... 428/380 |
| 5,563,377 | A * | 10/1996 | Arpin et al. | ............... 174/121 A |
| 5,841,072 | A * | 11/1998 | Gagnon | .................... 174/110 F |
| 5,841,073 | A * | 11/1998 | Randa et al. | ............... 174/113 R |
| 6,147,309 | A * | 11/2000 | Mottine et al. | ......... 174/110 PM |
| 7,795,539 | B2 * | 9/2010 | Thuot et al. | ................ 174/110 R |
| 2001/0000930 | A1 * | 5/2001 | Kim | ............................. 264/1.24 |
| 2003/0134104 | A1 | 7/2003 | Hokkirigawa et al. | |
| 2004/0241474 | A1 * | 12/2004 | Domine | ........................ 428/500 |
| 2010/0096159 | A1 | 4/2010 | Abe et al. | |
| 2010/0144912 | A1 * | 6/2010 | Kawasumi et al. | ............. 521/80 |

FOREIGN PATENT DOCUMENTS

| | | |
|---|---|---|
| JP | 36-21623 B | 11/1961 |
| JP | 57-2361 A | 1/1982 |
| JP | 2-106812 A | 4/1990 |
| JP | 11-130993 A | 5/1999 |
| JP | 3414479 B2 | 4/2003 |
| JP | 2006-31980 A | 2/2006 |
| JP | 2010-198845 A | 9/2010 |
| JP | 2011-174040 A | 9/2011 |
| JP | 2011-238384 A | 11/2011 |
| WO | WO 2010/051350 A1 | 5/2010 |
| WO | 2011/027748 A1 | 3/2011 |
| WO | WO 2011/118717 A1 | 9/2011 |
| WO | WO 2011/138934 A1 | 11/2011 |

OTHER PUBLICATIONS

International Search Report dated May 14, 2013, issued in PCT/JP2013/056169 (Form PCT/ISA/210).

Japanese Office Action (Notice of Reasons for Rejection) dated Jul. 2, 2013, issued in corresponding Japanese Patent Application No. 2013-514466.

Extended European Search Report dated Sep. 23, 2015, issued in corresponding European Patent Application No. 13758428.0.

* cited by examiner

INSULATED WIRE HAVING A LAYER CONTAINING BUBBLES, ELECTRICAL EQUIPMENT, AND METHOD OF PRODUCING INSULATED WIRE HAVING A LAYER CONTAINING BUBBLES

CROSS-REFERENCE TO RELATED APPLICATIONS

This application is a continuation of PCT/JP2013/056169 filed on Mar. 6, 2013 which claims benefit of Japanese Patent Application No. 2012-051036 filed on Mar. 7, 2012, the subject matters of which are incorporated herein by reference in their entirety.

TECHNICAL FIELD

The present invention relates to an insulated wire for use in various electrical equipments. Further, the present invention relates to an electrical equipment, such as an electrical motor and a transformer, in which the insulated wire is utilized. Further, the present invention relates to a method of producing the insulated wire.

BACKGROUND ART

Since from the past, an insulated wire in which a conductor is covered with an insulating film has been used in an electrical coil for various kinds of electrical equipment, such as motors and transformers. The insulated wire for forming the electrical coil is required to have adhesion to the conductor, electrical insulating property, and heat resistance. Especially in recent years, electrical equipments for aerospace use, electrical equipments for aircrafts, electrical equipments for nuclear power, electrical equipments for energy, and electrical equipments for automobiles, are required not only to be reduced in size and weight thereof but also to have higher performance. For example, rotating electrical machines such as a motor and transformers, are required to have a higher output power ever than before.

The rotating electrical machines are produced by pushing an insulated wire that is wound around a core into a slot. Since the insulated wire is pushed into this slot as many as possible, a high pressure is applied to an enameled wire. Therefore, the coating film of the insulating film should be made strong. However, since there are limitations on the strength of resins, it is necessary to make a structure which absorbs the impact.

In addition, requirement is increasing for a further thinner insulating film of the insulated wire. Thus, an improvement in dielectric breakdown voltage of the insulated wire is considered to be indispensable. Further, an insulated wire having a thin insulating film is required for being capable of reducing damage of the insulating film, which damage is caused upon pushing the insulated wire into the slot.

Further, a corona discharge may occur between the insulated wire and the slot and between insulated wires themselves, when a high voltage is applied at the time of operation of the rotating electrical machine. In a case where the applied voltage is not so high, requirement of corona-discharge resistance in an insulated wire was not so high. However, because a high voltage is applied in a rotating electrical machine with a high output power, an insulated wire is required, which is excellent in the corona-discharge resistance and high in the partial discharge inception voltage.

To improve the partial discharge inception voltage of an insulated wire, thickening of the insulating film is assumingly effective. However, in view of requirement of the film being thinner in the insulated wire, thickening of the insulating film is difficult. Usually, an insulated wire is produced by applying and baking a varnish of resin onto a conductor repeatedly. Since for thickening the insulating film, the number of times for passing through a baking furnace increases in a production process thereof, a coating film composed of copper oxide on a copper conductor surface is being thicker, due to this, adhesion between the conductor and the insulating film is lowered.

As another method to improve the partial discharge inception voltage of the insulated wire, a resin low in dielectric constant is used in the insulating film. However, such a use of the resin low in the dielectric constant is difficult, because the resin is usually low in a surface free energy and poor in the adhesion with the conductor.

Further, an insulated wire is proposed, which has an improved corona-discharge resistance, by blending particles into the insulating film. For example, there are proposals of an insulating film containing particles composed, for example, of alumina, silica, and chromium oxide (see, Patent Literatures 1 and 2) and an insulating film containing particles composed, for example, of nitrogen carbide and silicon nitride (see, Patent Literature 3). In these insulated wires, an erosion deterioration due to corona discharge is tried to be reduced, owing to the insulating film containing the particle. However, in the insulated wire having the insulating film containing these particles, flexibility of the film lowers to result in that a film surface may become rough in many cases. Due to this rough film surface, it is difficult to push the insulated wire into a slot. As a result, depending on the case, the insulated wire is poor in the abrasion resistance and the insulating film is apt to be damaged.

Furthermore, it has been suggested to use batch type foaming of a thermoplastic resin in order to decrease the dielectric constant of an insulated wire (see Patent Literature 4). For example, carbon dioxide is incorporated into a polyphenylene sulfide resin under high pressure conditions to cause the resin to foam. However, this method has a problem that bubbles within the thermoplastic resin collapse as a result of pressure molding, and the heatproof temperature is low.

Furthermore, it has been suggested to add a water-soluble alcohol or ether, or water to a varnish that foams a polyimide precursor; however, in this technique, it is known that since a low boiling alcohol or ether is used, an additive preferentially reacts with the polyimide precursor, a molecular weight is reduced, and sufficient heat resistance cannot be obtained (see Patent Literature 5).

Furthermore, Patent Literature 6 describes a technology for an insulated wire in which an insulating coating film is formed from a cured product of a thermosetting resin composition containing a thermoplastic resin and the insulating coating film has fine pores. However, in this technology, the thermosetting resin contains no bubbles. Bubbles are formed inside the thermoplastic resin particles in a network structure formed by applying a varnish of thermosetting resin containing a thermoplastic resin and baking the resin varnish.

CITATION LIST

Patent Literatures

Patent Literature 1: JP-A-57-2361 ("JP-A" means unexamined published Japanese patent application)
Patent Literature 2: JP-A-2-106812
Patent Literature 3: JP-A-11-130993
Patent Literature 4: Japanese patent application No. 2010-070068

Patent Literature 5: Japanese patent No. 3414479
Patent Literature 6: JP-A-2011-238384

SUMMARY OF INVENTION

Technical Problem

The present invention is contemplated for providing an enamel wire, which has a high partial discharge inception voltage and a high heat resistance and reduces stress applied to an insulating film at the time of processing. Further, the present invention is contemplated for providing an electrical equipment in which the insulated wire is utilized, which is excellent in durability. Still further, the present invention is contemplated for providing a method of producing the insulated wire.

Solution to Problem

The present inventors have been studied for solving the above-described problems.

The present inventors conducted an investigation on incorporating bubbles into an insulating film for an enameled insulated wire, as a method of decreasing the dielectric constant and increasing the partial discharge inception voltage. When this method is used, an impact absorbing effect can be also expected. As a result of the investigation, the present inventors found that when a solvent having a boiling point higher than that of the solvent component of an enamel resin varnish (high boiling solvent), which is uniformly dispersed in the organic solvent component of the varnish as a foaming agent, is incorporated into the enamel resin varnish, an insulated wire containing fine bubbles is obtained. That is, it was found that when three or more kinds of solvents including the organic solvent as a main solvent component of the varnish and at least one kind of the high boiling solvent are used in mixture, a varnish forming a coating film for insulated wire containing bubbles is formed. When such an insulated wire is formed, the partial discharge inception voltage can be increased without decreasing the dielectric breakdown voltage to an extent that the insulated wire cannot be used in a motor, and the insulated wire has an excellent abrasion resistance.

The present invention has been attained, based on this findings.

(1) An insulated wire, containing:
an insulating film made from a thermosetting resin disposed on a conductor directly or via an insulating layer interposed therebetween,
wherein the insulating film made from a thermosetting resin is a layer containing bubbles prepared by baking a varnish of thermosetting resin, and
wherein a layer containing no bubbles is formed as an upper or lower layer of the layer containing bubbles.

(2) The insulated wire as described in item (1), containing:
a thermosetting resin layer disposed as an insulating layer on a conductor directly or via another insulating layer interposed therebetween,
wherein the thermosetting resin layer contains bubbles having been formed by being foamed in step of baking the varnish of thermosetting resin, and
wherein the insulating layer containing bubbles made from a thermosetting resin has bubbles of an average size of 10 µm or less, a insulating layer containing no bubbles with a thickness of 1 µm or greater is disposed as an upper layer and/or a lower layer of the insulating layer containing bubbles, and the insulating layer containing bubbles made from a thermosetting resin is laminated in one or more layers.

(3) The insulated wire as described in item (1) or (2),
wherein the insulated wire has a combination of the layer containing bubbles and the layer containing no bubbles with a thickness of 1 µm or more as an upper layer and/or a lower layer of the layer containing bubbles, and
wherein the layer containing bubbles is laminated in two or more layers.

(4) The insulated wire as described in any one of items (1) to (3),
wherein the varnish of thermosetting resin contains a solvent for the thermosetting resin, a bubble forming agent, and a solvent having a boiling point higher than that of the solvent for the thermosetting resin as a mixed solvent.

(5) The insulated wire as described in any one of items (1) to (4),
wherein the thermosetting resin is a polyamideimide resin.

(6) The insulated wire as described in any one of items (1) to (5),
wherein the thermosetting resin layer containing bubbles contains a thermoplastic resin.

(7) A method of producing an insulated wire, containing the steps of:
applying a varnish of thermosetting resin on a conductor directly or via an insulating layer interposed therebetween;
baking the varnish of thermosetting resin to generate bubbles during the baking step for this varnish of a thermosetting resin so that the insulated wire has a layer containing bubbles made from the thermosetting resin as an insulating layer,
wherein the insulating layer containing bubbles has bubbles of an average size of 10 µm or less, an insulating layer containing no bubbles with a thickness of 1 µm or greater is disposed as an upper layer and/or a lower layer of the insulating layer containing bubbles, and the insulating layer containing bubbles made from the thermosetting resin is laminated in one or more layers.

(8) The method of producing an insulated wire as described in item (7),
wherein a high boiling solvent for bubble formation has a boiling point higher than that of a solvent for the thermosetting resin,
wherein the high boiling solvent takes the role as both a bubble nucleating agent and a foaming agent when one kind of the high boiling solvent is added to the varnish of a thermosetting resin, and
wherein the high boiling solvents act separately as the foaming agent and the bubble nucleating agent when two or more kinds of the high boiling solvents are used and added to the varnish.

(9) The method of producing an insulated wire as described in item (7) or (8),
wherein the varnish of thermosetting resin is a varnish of thermosetting resin using a mixed solvent composed of at least three kinds of solvents each having a boiling point of 160° C. or higher.

(10) An electrical/electronic equipment using the insulated wire as described in any one of items (1) to (6) in a coil of a transformer incorporated into the electrical/electronic equipment and/or a motor coil of a rotor.

Advantageous Effects of Invention

The present invention can provide an insulated wire, which has a high partial discharge inception voltage and a high heat resistance and is excellent in resistance to degradation of wire treatment. Further, the present invention can provide an electrical equipment, which is excellent in durability, by using the insulated wire. Further, the present invention can provide a method of producing the insulated wire.

Other and further features and advantages of the invention will appear more fully from the following description, appropriately referring to the accompanying drawings.

MODE FOR CARRYING OUT THE INVENTION

Preferable embodiments of the insulated wire of the present invention will be described with reference to the drawings.

Figure 3:
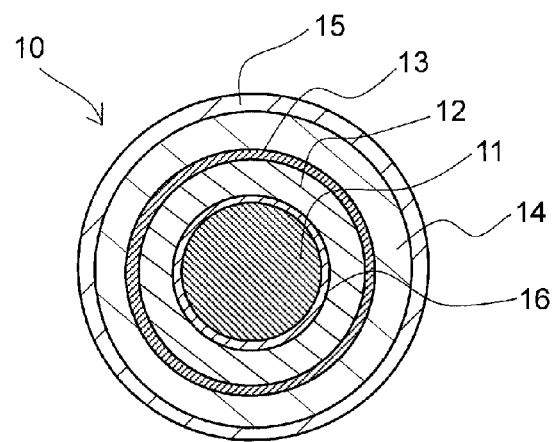
FIG. 3 is a cross-sectional view showing still another embodiment of the insulated wire of the present invention.

FIG. 3 is a schematic cross-sectional view showing a preferred embodiment of the insulated wire of the present invention. In FIG. 3, 10 represents an insulated wire, 11 represents a conductor, 12 represents an insulating layer containing bubbles, 13 and 14 represent insulating layers containing no bubbles, 14 represents an insulating layer containing bubbles, and 15 and 16 represent insulating layers containing no bubbles. As can be seen in FIG. 3, in the insulated wire 10 of the present invention, an outer circumference of a conductor 11 is covered with insulating layers 16 and 12. The insulating layer 12 includes at least one insulating formed by applying a varnish of resin that forms a thermosetting resin film containing bubbles by baking, on the outer circumference of the conductor directly or indirectly, and then baking the varnish of resin. Furthermore, the insulating layer 12 shows a structure having an insulating layer 13 on the outer side of the insulating layer 12. The insulating layer 12 has fine pores (not shown in the figure) inside the insulating layer. The insulating layer 14 is also the same as this. The bubble distribution density is $4 \times 10^9$ to $7 \times 10^{11}$ bubbles/cm$^3$, and more preferably $8 \times 10^9$ to $5 \times 10^{11}$ bubbles/cm$^3$, in the insulating film layer. In a case where the distribution density of bubbles is too large, mechanical strength such as resistance to collapse that is required in enameled wires is decreased, and in a case where the distribution density is too small, it is difficult to obtain the effect of decreasing the dielectric constant.

Figure 2:
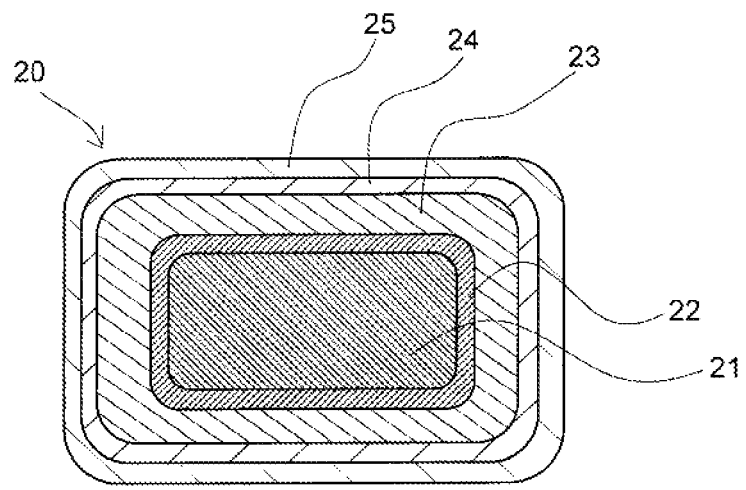
FIG. 2 is a cross-sectional view showing another embodiment of the insulated wire of the present invention.

The shape of the conductor is such that, as shown in FIG. 2, the cross-section may be rectangular or may have round corners. To explain this as a second embodiment, in an insulated wire 20, 21 represents a conductor, 22 represents an insulating layer containing no bubbles, 23 represents an insulating layer containing bubbles, 24 represents an insulating layer containing no bubbles, and 25 represents an insulating layer containing bubbles. The insulating layers containing bubbles 23 and 25 of this embodiment have the same structures as those of the insulating layers 12 and 14 of the first embodiment, and can be produced by generating bubbles by the same method.

Figure 1:
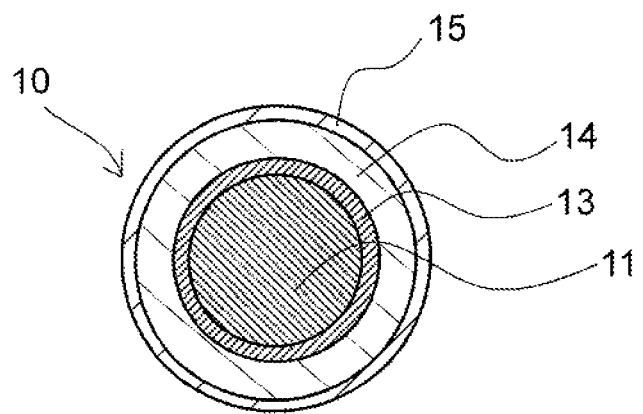
FIG. 1 is a cross-sectional view showing an embodiment of the insulated wire of the present invention.

FIG. 1 is a cross-sectional view showing another embodiment of the insulated wire of the present invention. In FIG. 1, the same reference numerals as those of FIG. 3 represent the same members as those of FIG. 3.

(Constitution of Insulated Wire)

In the present invention, examples of the conductor include those having been used from the past as a conductor of an insulated wire, such as copper, a copper alloy, aluminum, an aluminum alloy, or a combination of those.

The formation of an insulated wire having an insulating layer containing insulating bubbles can be carried out as follows.

The above-described material is used as the conductor, and a varnish is applied on the periphery thereof. On the occasion of preparation of the varnish, a varnish, which forms a coating film for an insulated wire having a layer containing bubbles when three or more kinds of solvents including a particular organic solvent and at least one kind of a high boiling solvent are mixed, is utilized. Next, the conductor is covered with this varnish. Subsequently, the varnish is heated to vaporize the organic solvent, and thus bubbles are formed in the applied varnish. Application of the varnish may be carried out directly on the conductor, or may be carried out with another resin layer interposed therebetween.

The organic solvent described above acts as a solvent for dissolving the thermosetting resin. This organic solvent is not particularly limited as long as the organic solvent does not inhibit the reaction of the thermosetting resin, and examples thereof include amide-based solvents such as N-methyl-2-pyrrolidone, N,N-dimethylacetamide, and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, and cyclohexane; and sulfone-based solvents such as sulfolane. Among these, in view of high solubility, high reaction promotion properties or the like, an amide-series solvent or a urea-series solvent is preferred; and in view of having no hydrogen atom that apts to inhibit a crosslinking reaction due to heating or the like, N-methyl-2-pyrrolidone, N,N-dimethylacetamide, N,N-dimethylethyleneurea, N,N-dimethylpropyleneurea or tetramethylurea is further preferred, and N-methyl-2-pyrrolidone is particularly preferred. The boiling point of this organic solvent is preferably 160° C. to 250° C., and more preferably 165° C. to 210° C.

The high boiling solvent that can be used for bubble formation is a solvent having a boiling point of preferably 180° C. to 300° C., and more preferably 210° C. to 260° C. At least one of such high boiling solvents acts as a bubble nucleating agent. Specific examples that can be used for bubble formation include diethylene glycol dimethyl ether, triethylene glycol dimethyl ether, diethylene glycol dibutyl ether, tetraethylene glycol dimethyl ether, and tetraethylene glycol monomethyl ether. From the viewpoint of having a smaller fluctuation in the bubble size, triethylene glycol dimethyl ether is more preferred. Furthermore, the examples that can be used for bubble formation include diethylene glycol dimethyl ether, dipropylene glycol dimethyl ether, diethylene glycol ethyl methyl ether, dipropylene glycol monomethyl ether, diethylene glycol diethyl ether, diethylene glycol monomethyl ether, diethylene glycol butyl methyl ether, tripropylene glycol dimethyl ether, triethylene glycol dimethyl ether, triethylene glycol monovinyl ether, triethylene glycol dipropyl ether, tetraethylene glycol methyl propyl ether, tetraethylene glycol methyl vinyl ether, diethylene glycol dipropyl ether, diethylene glycol divinyl ether, diethylene glycol monobutyl ether, ethylene glycol monophenyl ether, triethylene glycol monomethyl ether, diethylene glycol dibutyl ether, triethylene glycol butyl methyl ether, polyethylene glycol dimethyl ether, tetraethylene glycol dimethyl ether, polyethylene glycol monomethyl ether, and propylene glycol moomethyl ether. Among them, tetraethylene glycol dimethyl ether, diethylene glycol dibutyl ether, triethylene glycol dimethyl ether, diethylene glycol diethyl ether, triethylene glycol monomethyl ether and the like are preferred as a bubble nucleating agent. Preferred combinations of at least two kinds of the high boiling solvents include tetraethylene glycol dimethyl ether with diethylene glycol dibutyl ether, diethylene glycol dibutyl ether with triethylene glycol dimethyl ether, triethylene glycol monomethyl ether with tetraethylene glycol dimethyl ether, and triethylene glycol butyl methyl ether with tetraethylene glycol dimethyl ether. More preferred combinations include diethylene glycol dibutyl ether with triethylene glycol dimethyl ether, and triethylene glycol monomethyl ether with tetraethylene glycol dimethyl ether.

The high boiling solvent for bubble formation needs to have a boiling point higher than that of the solvent for the thermosetting resin, and when one kind of the high boiling solvent is added to the varnish, it is preferable that the boiling point of the high boiling solvent be higher by 10° C. or more than that of the solvent for the thermosetting resin. Furthermore, it is understood that when one kind of the high boiling solvent is used, the high boiling solvent takes the role of both a bubble nucleating agent and a foaming agent. On the other hand, when two or more kinds of the high boiling solvents are used, the solvent having the highest boiling point acts as a foaming agent, and a high boiling solvent for bubble formation having a boiling point that is intermediate between the solvent for the thermosetting resin and the high boiling solvent having the highest boiling point acts as a bubble nucleating agent. The solvent having the highest boiling point preferably has a boiling point that is higher by 20° C. or more, and more preferably by 30° C. to 50° C., than the solvent for the thermosetting resin. The high boiling solvent for bubble formation having the intermediate boiling point may have a boiling point that is intermediate between the boiling point of the solvent that acts as a foaming agent and the boiling point of the solvent for the thermosetting resin, and preferably has a difference in boiling point of 10° C. or more from the boiling point of the foaming agent. In a case where the high boiling solvent for bubble formation having the intermediate boiling point has a solubility for the thermosetting resin higher than that of the solvent that acts as a foaming agent, uniform bubbles can be formed after varnish baking.

It was found that when three or more kinds selected from the organic solvents described above and at least one kind of high boiling solvents are mixed, a varnish capable of forming a coating film for an insulated wire that has an insulating layer including a bubble layer is formed.

According to the present invention, enhanced foaming can be achieved, that is, a remarkable decrease in the dielectric constant of a coating film can be achieved. The reason will be described below.

A foaming ratio can be calculated from relative dielectric constant. In general, it is known that the relationship between the foaming ratio of a foam and a relative dielectric constant is represented by the following formula (A. S. Windeler's formula).

$$\frac{\varepsilon_i - \varepsilon^*}{\varepsilon_i - \varepsilon_a} = \frac{F}{100} \frac{3\varepsilon^*}{2\varepsilon^* + \varepsilon_a}$$

Relative dielectric constant of foam $\varepsilon^*$
Relative dielectric constant of insulated body $\varepsilon_i$
Relative dielectric constant of bubbles (air) $\varepsilon_a$ (=1)
Volume ratio of bubbles F {%}
Herein, the foaming ratio can be calculated by the formula: foaming ratio (times)=1/(1−F/100).

The foaming ratio of the coating film in the present invention calculated as described above is approximately 1.2 times to 1.7 times, in a case where the base polymer is PAI.

As such, enhanced foaming can be achieved by the present invention, and a remarkable decrease in the dielectric constant of a coating film can be achieved.

In the present invention, a thermosetting resin is used for the insulating film, but the polyamideimide resin and the like that will be described below are preferably used.

Regarding the polyamideimide resin, a commercially available product (for example, HI406 (trade name, manufactured by Hitachi Chemical Co., Ltd.) can be used, or, for example, a product obtained by allowing a tricarboxylic acid anhydride to directly react with diisocyanates by a conventional method in a polar solvent can be used.

As a polyimide, for example, U-IMIDE (trade name, manufactured by Unitika, Ltd.), U-VARNISH (trade name, manufactured by Ube Industries, Ltd.), HCI Series (trade name, manufactured by Hitachi Chemical Co., Ltd.) and AURUM (trade name, manufactured by Mitsui Chemicals, Inc.) can be used.

The thermosetting resins described above may be used singly, or may be used as mixtures of two or more kinds thereof. In the present invention, to the extent that the purpose of the present invention is not impaired, various additives such as a crystallization nucleating agent, a crystallization accelerator, a bubble nucleating agent, a defoamant, a surfactant, an oxidation inhibitor, an antistatic agent, an ultraviolet preventing agent, a photostabilizer, a fluorescence brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer may be incorporated.

Furthermore, the thermosetting resin may be mixed with a thermoplastic resin having a high glass transition temperature. When the thermoplastic resin is incorporated, flexibility and elongation characteristics are improved. The addition amount is preferably 5 wt % to 50 wt % of the resin solid content.

The thermoplastic resin that can be used for this purpose is preferably composed of at least one selected from polyether imide, polyether sulfone, polyphenylene ether, polyphenylsulfone, and polyimide. Examples of the polyether imide that can be used include ULTEM (manufactured by GE Plastics, Inc., trade name). Examples of the polyether sulfone that can be used include SUMIKA EXCEL PES (trade name, manufactured by Sumitomo Chemical Co., Ltd.), PES (trade name, manufactured by Mitsui Chemicals, Inc.), ULTRAZONE E (trade name, manufactured by BASF Japan Ltd.), and RADEL A (trade name, manufactured by Solvay Specialty Polymers Japan K.K.). Examples of the polyphenylene ether that can be used include XYRON (trade name, manufactured by Asahi Kasei Chemicals Corp.) and IUPIACE (trade name, manufactured by Mitsubishi Engineering Plastics Corp.). Examples of the polyphenylsulfone that can be used include RADEL R (trade name, manufactured by Solvay Specialty Polymers Japan K.K.). Examples of the polyimide that can be used include U-VARNISH (trade name, manufactured by Ube Industries, Ltd.), HCI Series (trade name, manufactured by Hitachi Chemical Co., Ltd.), U-IMIDE (trade name, manufactured by Unitika, Ltd.), and AURUM (trade name, manufactured by Mitsui Chemicals, Inc.). From the viewpoint of being easily dissoluble in a solvent, polyphenylsulfone and polyether imide are more preferred.

(Preparation of Insulated Wire)

In the insulated wire of the present invention, as shown in FIG. 1 and FIG. 2, an insulating layer includes an insulating layer containing fine bubbles and a layer containing no bubbles. The layer containing no bubbles is configured, as shown in FIG. 1 and FIG. 2, as an upper layer and/or a lower layer of the insulating layer containing fine bubbles.

This insulating layer containing bubbles may be formed directly on the conductor, or may be constructed via a layer containing no bubbles interposed therebetween. Furthermore, it is known that the layer containing no bubbles has high insulating performance. The layer containing bubbles that has the layer containing no bubbles as an upper layer and/or a lower layer can be produced by adding one kind or two or more kinds of solvent for foaming to the foaming agent in the present invention, and performing baking at a furnace temperature of 500° C. to 520° C. In this case, the thickness of the layer containing no bubbles can be adjusted to 1 µm to 2 µm, by means of the amount of addition of the foaming agent or the like. Furthermore, for an insulating layer in which a layer containing no bubbles does not exist at all in the upper part or the lower part thereof, the insulating layer can be produced by baking a varnish for foaming to which one kind or two or more kinds of foaming agents (high boiling solvents) has been added, at a furnace temperature of 550° C. or higher. When the varnish is rapidly polymerized and solidified, the region containing bubbles can be broadened over the entire coating film. Furthermore, when the layer that does not foam was constructed in any one of the upper part and the lower part, an enameled wire was produced by forming, under the same conditions, a layer in which a layer containing no bubbles does not exist in the upper part or the lower part, and baking a varnish that did not include a foaming agent in the upper part or in the lower part.

According to the present invention, even in a case where partial discharge occurs, and the insulated wire is exposed to discharge for a long time, the insulated wire can be prevented from undergoing dielectric breakdown. In order to further improve dielectric breakdown resistance in a test of exposing the insulated wire to this partial discharge for a long time, the insulating layer containing bubbles and the layer containing no bubbles in the present invention may contain an inorganic filler such as titanium oxide, silica or alumina. In order not to inhibit the generation of bubbles, the average primary particle size of the inorganic filler is preferably less than 10 µm. When it is intended to more effectively exhibit the partial discharge resistance, it is more preferable to further increase the thickness of the insulating layer containing no bubbles on the upper layer side.

In regard to the effect of decreasing the dielectric constant, it is more advantageous to have more insulating layers containing bubbles. The layer containing no bubbles is such that in order not to disturb the effect of decreasing the dielectric constant, the total thickness of the layers containing no bubbles is preferably 80% or less, and more preferably 50% or less, relative to the total thickness of the insulating layers.

Furthermore, when an insulated wire having a layer containing bubbles and a layer containing no bubbles in combination is produced, mechanical strength such as abrasion resistance and tensile strength can be secured.

When it is intended to form a layer containing no bubbles on the outer side of the layer containing bubbles, a resin film may be attached by lamination to the insulating layer containing bubbles, a varnish containing no foaming agent may be applied as an upper layer and baked, or the layer containing no bubbles may be constructed at the time of forming the insulating layer containing bubbles by modifying the baking conditions. When the efficiency at the time of production is considered, it is more preferable to bake a varnish containing no bubble forming agent.

In regard to the insulated wire containing bubbles of the present invention, the upper limit of the thickness of the layer containing no bubbles is not particularly limited, and the thickness can be freely designed depending on the required characteristics of the dielectric breakdown voltage. However, from the viewpoint of realizing a remarkable decrease in the relative dielectric constant, the thickness of the layer containing no bubbles is preferably less than 80%, relative to the total thickness of the insulating layers. In view of satisfying mechanical characteristics such as abrasion characteristics, the thickness of the layer containing no bubbles is more preferably 40% to 70%. As a thickness value, the layer containing bubbles preferably has a thickness of 3 to 40 µm, more preferably 5 to 28 µm. The layer containing no bubbles preferably has a thickness of 0.5 to 20 µm, more preferably 1 to 15 µm.

A method for forming fine bubbles in the insulating film of the insulated wire of the present invention is not particularly limited. The average diameter of the bubbles is preferably 10 µm or less. Thereby, the dielectric breakdown voltage can be maintained at a high value. The average diameter of pores is more preferably 5 µm or less. The lower limit thereof is not limited, and the average diameter can be freely designed depending on the required characteristics of the characteristic of life in charged state (V-t characteristics) of the insulated wire. Usually, the average diameter of the pores is 3 µm to 5 µm. In a case where the bubble size is too large, the dielectric breakdown voltage is decreased. The average diameter of the pore size can be measured by SEM observation.

Regarding the method of controlling the size of bubbles, additives such as a surfactant, a defoamant and a bubble nucleating agent may be incorporated, or the concentration of the insulating coating material may be changed. Furthermore, regarding the technique of preventing changes in the components, the furnace temperature for baking may be changed, or the temperature of the varnish may be controlled in the coating apparatus.

Specific examples of the method for forming fine bubbles in the insulating film of the insulated wire of the present invention include the following methods. After the varnish of resin described above is applied on the outer circumference of the conductor and baked, the insulating film is impregnated with a gas and then heated, and thereby fine pores can be formed. To explain in more detail, an insulated wire containing fine pores in the insulating layer can be produced by a method including: a step of maintaining a conductor having a varnish of resin applied and baked thereon in a pressurized inert gas atmosphere, and thereby incorporating an inert gas into the layer formed by baking the varnish of resin; and a step of heating the layer formed by baking the varnish of resin under normal pressure and thereby forming pores.

In the case of using a varnish that uses the bubble forming agent in the present invention, bubbles can be formed in the furnace for baking enameled wires, and through a single-time baking of the varnish, preliminary drying, foaming and curing reactions can be carried out.

The insulated wire of the present invention can be produced, for example, as follows. That is, an insulated wire can be produced by applying and baking the varnish of resin described above on the outer circumference of a conductor, and passing the product in a hot air furnace to thereby continuously form bubbles in the coating film.

Furthermore, the foam cell size of independent bubbles can be adjusted by changing the difference in the boiling point of the solvents. In consideration of cost factors such as the time taken for baking, the solvent used preferably has a boiling point of 140° C. to 300° C. In consideration of the solubility of the base resin, glyme-based solvents, which are solvents sparingly soluble in water, or alcohol-based solvents are preferred. In consideration of the strength of the foamed insulating film, glyme-based solvents having a boiling point of 210° C. to 260° C. are preferred. In a case where a low boiling alcohol is used, it can be seen that the thermosetting reaction is inhibited, and the glass transition temperature of the insulating film thus formed is lowered. It can be said that the abrasion characteristics by reciprocating movement of blade, flexibility, solvent resistance and the like are significantly deteriorated thereby.

Furthermore, the reason why three or more kinds of solvents are used is that the solvent having the lowest boiling point acts as a bubble nucleating agent. When only two kinds of solvents such as a solvent that is used as a main solvent of varnish, and a solvent that is used as a bubble forming agent are employed, it is difficult to have bubbles generated. Generally, vaporization is mildly achieved in a system having different kinds of compounds mixed therein, rather than a uniform solvent system. Therefore, if only two kinds of solvents are used, when bubbles are generated, the bubble size becomes large due to bumping, and a fluctuation in the bubble size is likely to occur. Any solvent after the third solvent is desirably a solvent having a boiling point higher than that of the solvent used as a resin solvent.

In the mixed solvent that is used as the solvent, the solvent having the lowest boiling point more preferably has a boiling point of 160° C. or higher. This is based on the temperature of the furnace for baking. In the case of the production conditions in the present invention, the furnace temperature is set to approximately 500° C. to 600° C., and in the case of a solvent having a boiling point of lower than 160° C., since vaporization becomes vigorous, the bubble size becomes large, and a fluctuation in the bubble size is likely to occur.

The insulated wire obtained by using the method of the present invention is frequently used at a high temperature after being fabricated into a coil form. In order to prevent deformation that may occur when the insulated wire is exposed to a high temperature under load, a thermosetting resin is at least an essential component. Furthermore, even for the thermosetting resin, in a case where the glass transition temperature is low, deformation may occur, or the deterioration reaction may be accelerated. For a coating film exhibiting stabilized performance on an insulated wire even at high temperature, the glass transition temperature is preferably 200° C. or higher.

The insulated wire of the present invention has a high dielectric breakdown voltage and a high partial discharge inception voltage, and has excellent abrasion resistance. Therefore, the insulated wire can be used in various electrical equipments such as a motor or a transformer.

EXAMPLES

The present invention will be described in more detail based on examples given below, but the invention is not meant to be limited by these.

1. Preparation of Insulated Wire

Insulated wires having structures indicated in the following Tables 1 and 2 were produced as follows.

Example 1

An insulated wire as shown in FIG. 1 was produced as follows.

In a 2-L separable flask, HI-406 (an NMP solution containing resin components at a proportion of 32% by mass) (trade name, manufactured by Hitachi Chemical Co., Ltd.) was introduced, and tetraethylene glycol dimethyl ether and triethylene glycol dimethyl ether were added to this solution as bubble forming agents. Thus, a varnish capable of forming bubbles was obtained.

This varnish capable of forming bubbles was applied on the outer circumference of a copper wire having a diameter of 1 mm, and baking was performed at a furnace temperature of 500° C. Thus, an insulated wire of Example 1 having a coating film which had a thickness of 32 μm and included a 2-μm layer containing no bubbles as an upper layer and a lower layer, on the outer circumference of the conductor was obtained. The bubble distribution density was $5 \times 10^{10}$ bubbles/cm$^3$ in the insulating film layer.

Example 2

Figure 4:
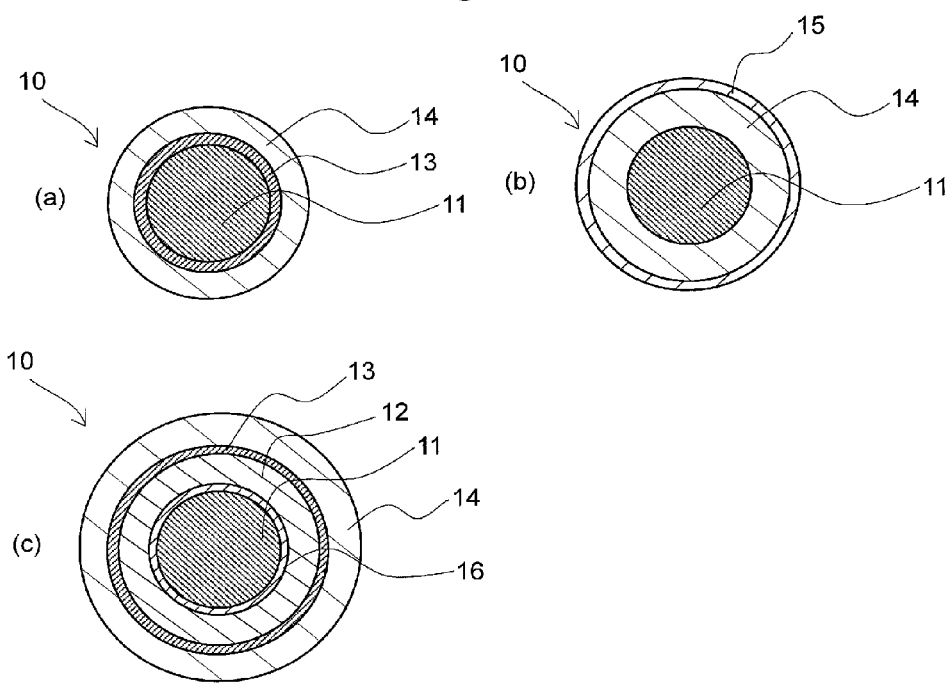
FIGS. 4(a), 4(b), and 4(c) are cross-sectional views showing the insulated wires produced in Example 2, Example 3, and Example 6, respectively.

An insulated wire as shown in FIG. 4(a) was produced as follows.

In a 2-L separable flask, HI-406 (an NMP solution containing resin components at a proportion of 32% by mass) (trade name, manufactured by Hitachi Chemical Co., Ltd.) was introduced, and N,N-dimethylpropyleneurea, triethylene glycol dimethyl ether, and N-dimethylethyleneurea were added to this solution as bubble forming agents. Thus, a varnish capable of forming bubbles was obtained.

First, HI-406 (trade name, manufactured by Hitachi Chemical Co., Ltd.) containing no bubble forming agent added thereto was applied and baked on the outer circumference of a copper wire having a diameter of 1 mm, subsequently the varnish capable of forming bubbles described above was applied thereon, and baking was performed at a furnace temperature of 550° C. Thus, an insulated wire of Example 2 having a coating film having a thickness of 31 μm on the outer circumference of the conductor was obtained. The bubble distribution density was $4 \times 10^{10}$ bubbles/cm$^3$ in the insulating film layer.

Example 3

An insulated wire as shown in FIG. 4(b) was produced as follows. The same varnish capable of forming bubbles as that of Example 2 was applied on the outer circumference of a copper wire having a diameter of 1 mm, and baking was performed at a furnace temperature of 550° C. Furthermore, HI-406 (trade name, manufactured by Hitachi Chemical Co., ltd.) as a varnish of thermosetting resin PAI was applied with no change as an outer layer and baked. Thus, an insulated wire of Example 3 having a coating film having a thickness of 32 μm on the outer circumference of the conductor was obtained. The bubble distribution density was $4 \times 10^{10}$ bubbles/cm$^3$ in the insulating film layer.

Example 4

An insulated wire as shown in FIG. 3 was produced as follows. In a 2-L separable flask, U-IMIDE (manufactured by Unitika, Ltd., trade name) was introduced as a varnish of PI, and NMP, DMAC and tetraethylene glycol dimethyl ether were added thereto as solvents. Thus, a varnish capable of forming bubbles was obtained. HI-406 (trade name, manufactured by Hitachi Chemical Co., Ltd.) containing no bubble forming agent was applied on the outer circumference of a copper wire having a diameter of 1 mm, and baking was performed at a furnace temperature of 550° C. Furthermore, application and baking of the varnish capable of forming bubbles, and application and baking of the varnish containing no bubble forming agent were repeated two times, and thus an insulated wire of Example 4 having a coating film having a thickness of 30 μm was obtained. The thicknesses of the layers containing bubbles were 11 μm and 11 μm, as viewed from the conductor side. The bubble distribution density was $5\times10^{11}$ bubbles/cm$^3$ in the insulating film layer.

Example 5

Baking was performed in the same manner as in Example 4, except that the repeating number was changed to 4 times. Thus, an insulated wire of Example 5 having a coating film having a thickness of 30 μm was obtained. The thicknesses of the layers containing bubbles were 6 μm, 5 μm, 5 μm and 4 μm, as viewed from the conductor side. The bubble distribution density was $5\times10^{11}$ bubbles/cm$^3$ in the insulating film layer.

Example 6

An insulated wire as shown in FIG. 4(c) was produced as follows.

In a 2-L separable flask, 1,600 g of NMP (N-methyl-2-pyrrolidone) was introduced, and 400 g of PEI was added thereto at room temperature in small amounts. The mixture was stirred for 24 hours at room temperature, and thus a yellow transparent solution was obtained. The solution thus obtained was added to 5,000 g of a varnish of thermosetting resin PAI; HI-406 (an NMP solution containing resin components at a proportion of 32% by mass), and the mixture was stirred for one hour. Thus, a solution containing a thermoplastic resin and a thermosetting resin was obtained. Triethylene glycol monomethyl ether and diethylene glycol dibutyl ether were added to this solution as bubble forming agents, and thus a varnish capable of forming bubbles was obtained. First, HI-406 (trade name, manufactured by Hitachi Chemical Co., Ltd.) containing no bubble forming agent was applied and baked on the outer circumference of a copper wire having a diameter of 1 mm, and then this varnish capable of forming bubbles was applied thereon. Baking was performed at a furnace temperature of 550° C. Furthermore, application and baking of the varnish containing no bubble forming agent and the varnish capable of forming bubbles were repeated, and thus an insulated wire of Example 6 having a coating film having a thickness of 31 μm on the outer circumference of the conductor was obtained. The thicknesses of the layers containing bubbles were 11 μm and 10 μm, as viewed from the conductor side. The bubble distribution density was $2\times10^{11}$ bubbles/cm$^3$ in the insulating film layer.

Comparative Example 1

Baking was performed in the same manner as in Example 1, except that the baking temperature was set to 620° C. As a result, an insulated wire of Comparative Example 1 having a coating film which had a thickness of 32 μm and did not have a layer containing no bubbles, was obtained. The bubble distribution density was $5\times10^{11}$ bubbles/cm$^3$ in the insulating film layer.

Comparative Example 2

Baking was performed in the same manner as in Example 2, except that one layer of HI-406 (solid content concentration: 10%) containing no a bubble forming agent was baked on a conductor and the baking temperature was changed to 600° C. As a result, an insulated wire of Comparative Example 2 having a coating film having a thickness of 31 μm, which included a layer containing no bubbles with a thickness of 0.1 μm as a lower layer of a layer containing bubbles, was obtained. The bubble distribution density was $5\times10^{11}$ bubbles/cm$^3$ in the insulating film layer.

Comparative Example 3

In a 2-L separable flask, HI-406 (trade name, manufactured by Hitachi Chemical Co., Ltd.) was introduced, and NMP was added thereto. N,N-dimethylpropyleneurea was added to this solution as a bubble forming agent, and thus a varnish capable of forming bubbles was obtained.

This varnish was applied on the outer circumference of a copper wire having a diameter of 1 mm, and baking was performed at 550° C. Thus, an insulating layer containing bubbles, in which a layer containing no bubbles was not exist as an upper layer and a lower layer, was formed. Furthermore, an HI-406 varnish containing no bubble forming agent was baked as an outer layer having a thickness of 5 μm, and thus an insulated wire of Comparative Example 3 having a coating film having a thickness of 32 μm on the outer circumference of the conductor was obtained. The bubble distribution density was $8\times10^{11}$ bubbles/cm$^3$ in the insulating film layer.

Comparative Example 4

In a 2-L separable flask, 1,600 g of NMP (N-methyl-2-pyrrolidone) was introduced, and 400 g of PAR was further added thereto at room temperature in small amounts. The mixture was stirred for 24 hours at room temperature, and thus a colorless transparent solution was obtained. This varnish was applied on the outer circumference of a copper wire having a diameter of 1 mm, and baking was performed at 520° C. Thus, an insulated wire of Comparative Example 4 having a coating film having a thickness of 30 μm and containing no bubbles on the outer circumference of the conductor was obtained.

Comparative Example 5

In a 2-L separable flask, HI-406 (an NMP solution containing resin components at a proportion of 32% by mass) (trade name, manufactured by Hitachi Chemical Co., Ltd.) was introduced, and ethylene glycol monomethyl ether acetate was added to this solution as a bubble forming agent. Thus, a varnish capable of forming bubbles was obtained. This varnish was applied on the outer circumference of a copper wire having a diameter of 1 mm, and baking was performed at 520° C. Thus, an insulated wire of Comparative Example 5 having a coating film containing bubbles on the outer circumference of the conductor was obtained. However, due to defective external appearance, the film thickness could not be measured. The bubble distribution density was $9 \times 10^{11}$ bubbles/$cm^3$ in the insulating film layer.

Comparative Example 6

HI-406 was applied on the outer circumference of a copper wire having a diameter of 1 mm, and baking was performed at 520° C. Thus, an insulated wire of Comparative Example 6 having a coating film having a thickness of 30 μm and containing no bubbles in all of the layers on the outer circumference of the conductor was obtained.
(Thickness of Insulating Layer Containing Bubbles and Average Bubble Size)
The thickness of the insulating layer containing pores and the average bubble size were determined from scanning electron microscopic (SEM) photographs of cross-sections of the insulated wire (average of the diameters of 20 bubbles arbitrarily selected from a cross-section).
[Dielectric Breakdown Voltage]
The dielectric breakdown voltage was measured in accordance with the twisted pair method.
(Twisted pair method) Two of any of the insulated wires were twisted together, and an alternating current voltage with sine wave at frequency 50 Hz was applied between the conductors. While the voltage was continuously increased, the voltage (effective value) at which the dielectric breakdown occurred, was measured. The measurement temperature was set at 25° C. A dielectric breakdown voltage of 5.0 kV or higher was judged to pass the test criteria, while a dielectric breakdown voltage of less than 5.0 kV was judged not to pass the test criteria.

(Relative Dielectric Constant)
For the relative dielectric constant, the electrostatic capacity of the resultant respective enameled wire was measured, and the relative dielectric constant obtained from the electrostatic capacity and the thickness of the insulating layer was taken as the measured value. For the measurement of the electrostatic capacity, LCR HITESTER (manufactured by Hioki E.E. Corp., Model 3532-50) was used. As the relative dielectric constant was lower, the electric characteristics were excellent, and a dielectric constant of 3.5 or less was judged to pass the test criteria.
(Abrasion Characteristic by Reciprocating Movement of Blade)
Abrasion resistance of the enameled wire was evaluated by a blade reciprocating method. Abrasion was caused by subjecting a blade under a certain load to reciprocating movement and the number of times taken until conduction occurred was measured. An enameled wire which did not acquire conduction in 15 times or more was judged to pass the test criteria.
(Life in Charged State (V-t Test))
Two wires were twisted with each other, and a voltage V of 1 kVp was applied between the respective conductors at 10 kHz using a sine wave constant voltage power supply. Then, the time t taken until dielectric breakdown occurred was measured. The measurement environment was at 25° C. and 50% RH in air. A wire having a time to dielectric breakdown of 50 minutes or longer was judged to pass the test criteria.
The results for evaluation of the insulated wires obtained in Examples 1 to 5 and Comparative Examples 1 to 6 are shown in Tables 1 and 2.

TABLE 1

| | | Example 1 | Example 2 | Example 3 | Example 4 | Example 5 | Example 6 |
|---|---|---|---|---|---|---|---|
| State of coating film | Base polymer | PAI | PAI | PAI | PI | PI | PAI + PEI (PAI:PEI = 8:2) |
| | Number of insulating layer containing bubbles (layer) | 1 | 1 | 1 | 2 | 4 | 2 |
| | Layer containing no bubbles (upper) | ○ | × | ○ | ○ | ○ | × |
| | Thickness of layer containing no bubbles (upper) <μm> | 2 | 0 | 10 | 5 | 2 | 0 |
| | Layer containing no bubbles (lower) | ○ | ○ | × | ○ | ○ | ○ |
| | Thickness of layer containing no bubbles (lower) <μm> | 2 | 1 | 0 | 2 | 2 | 5 |
| | Total film thickness <μm> | 32 | 31 | 32 | 31 | 30 | 31 |
| | Average bubble size | 5 | 5 | 5 | 2 | 2 | 3 |
| Characteristic of insulated wire | Dielectric breakdown voltage <kV> | 5.2 | 5.0 | 7.0 | 5.0 | 5.3 | 5.8 |
| | Abrasion characteristic by reciprocating movement of blade <number of times> | 16 | 24 | 25 | 21 | 30 | 20 |
| | Tg of coating film <° C.> | 285 | 283 | 285 | 303 | 290 | 283 |
| | Relative dielectric constant | 2.7 | 2.5 | 3.3 | 1.8 | 2.5 | 2.3 |
| | V-t characteristic <min> | 60 | 70 | 140 | Breakdown was not occurred. | Breakdown was not occurred. | Breakdown was not occurred. |
| Bubble forming agent | Number of solvent used | 3 | 4 | 3 | 3 | 3 | 3 |
| | Lowest boiling point of solvent used | 200 | 200 | 200 | 165 | 165 | 200 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| State of coating film | Base polymer | PAI | PAI | PAI | PAR | PAI | PAI |
| | Number of layer containing bubbles (layer) | 1 | 1 | 1 | not foamed | 0 | 0 |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
|  | Layer containing no bubbles (upper) | x | x | ○ |  | External appearance was defective. | — |
|  | Thickness of insulating layer containing no bubbles (upper) <μm> | 0 | 0 | 5 |  |  | — |
|  | Layer containing no bubbles (lower) | x | ○ | x |  |  | — |
|  | Thickness of layer containing no bubbles (lower) <μm> | 0 | 0.1 | 0 |  |  | — |
|  | Total film thickness <μm> | 32 | 31 | 32 |  |  | 30 |
|  | Average bubble size | 5 | 5 | 15-20 |  | 30 | — |
| Characteristic of insulated wire | Dielectric breakdown voltage <kV> | 3.2 | 1.5 | 1.5 | — | — | 10.0 |
|  | Abrasion characteristic by reciprocating movement of blade <number of times> | 5 | 3 | 5 | — | — | — |
|  | Tg of coating film <° C.> | 285 | 283 | 285 | 193 | 275 | 285 |
|  | Relative dielectric constant | 1.5 | 1.5 | 2.5 | 3.5 | — | 4 |
|  | V-t characteristic <min> | 24 | 23 | 10 | — | — | 70 |
| Bubble forming agent | Number of solvent used | 3 | 4 | 2 | 1 | 3 | 1 |
|  | Lowest boiling point of solvent used | 200 | 200 | 200 | 200 | 145 | 200 |

As can be seen from Tables 1 and 2, the insulated wires of Examples 1 to 6 exhibited excellent results in terms of the relative dielectric constant, the dielectric breakdown voltage, and the abrasion characteristic. Contrary to the above, the insulated wire having no layer containing no bubbles was low in the relative dielectric constant, but the withstand voltage and the abrasion characteristic by reciprocating movement of blade were not at the level passing the test criteria (Comparative Example 1). Furthermore, in a sample in which the thickness of the layer containing no bubbles was 0.1 μm, the relative dielectric constant was similarly low, but the dielectric breakdown voltage and the abrasion characteristic by reciprocating movement of blade were not at the level passing the test criteria (Comparative Example 2). Furthermore, as shown in Comparative Example 3, in an insulated wire having large bubbles with an average bubble size of 15 μm or more, the dielectric breakdown voltage and the abrasion characteristic by reciprocating movement of blade were not at the level passing the test criteria. Furthermore, it was found that in Example 4 having a low glass transition temperature, bubbles could not be incorporated. When a solvent having a boiling point of 145° C. was used as the solvent used as a bubble forming agent, it was found that due to the excessively low boiling point, evaporation occurred vigorous at the time of baking, and the insulated wire with defective external appearance could only be obtained (Comparative Example 5). When a varnish having only one kind of solvent that was used as a bubble forming agent was baked, bubbles were not generated, that is, a decrease in the relative dielectric constant could not be observed (Comparative Example 6).

As shown in Examples 1 to 6, it was found that an insulated wire, in which a layer having no insulating layer containing bubbles incorporated by heating was formed on the outer circumference of the conductor with a thickness of 1 μm or more as an upper layer and/or a lower layer of an insulating layer containing fine bubbles, had a satisfactory dielectric breakdown voltage of 5 kV or more and satisfactory abrasion characteristic by reciprocating movement of blade. Particularly, in the insulated wire in which a bubble forming agent was added to a base polymer of PI having a low dielectric constant or PAI added with a thermoplastic resin PEI and the insulating layer was baked, it was found that particularly the V-t characteristic after bubble generation was satisfactory, and discharge did not occur, or even if discharge occurred, breakdown did not easily occur (Examples 4 to 6). Furthermore, the insulated wires in which bubbles were formed in a varnish of PAI resin exhibited satisfactory dielectric breakdown voltage and abrasion characteristic by reciprocating movement of blade, and also, the glass transition temperature was stable. Thus, it was found that the insulated wires having high reliability can be produced (Examples 1 to 3). On the contrary, in the case of PI, it was found that the fluctuation in the glass transition temperature was larger than that of the insulated wire using PAI, due to the configuration of baking (Examples 4 and 5). From this point of view, the material used in the coating film of the insulated wire of the present invention is more preferably PAI.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2012-051036 filed in Japan on Mar. 7, 2012, which is entirely herein incorporated by reference.

REFERENCE SIGNS LIST

10 Insulated wire
11 Conductor
12 Insulating layer containing bubbles
14 Insulating layer containing bubbles
13, 15, 16 Layer containing no bubbles
10 Insulated wire

The invention claimed is:
1. An insulated wire, comprising:
an insulating film made from a thermosetting resin disposed on a conductor directly or via an insulating layer interposed therebetween,
wherein the insulating film made from a thermosetting resin is a layer containing bubbles prepared by baking a varnish of thermosetting resin, and wherein a layer containing no bubbles is formed as an upper or lower layer of the layer containing bubbles, and wherein the insulating layer containing bubbles made from a thermosetting resin has bubbles of an average size of 10 μm or less, an insulating layer containing no bubbles with a thickness of 1 μm or greater is disposed as an upper layer and/or a lower layer of the insulating layer containing bubbles, and the insulating layer containing bubbles made from a thermosetting resin is laminated in one or more layers.

2. The insulated wire as described according to claim 1, wherein the insulated wire has a combination of the layer containing bubbles and the layer containing no bubbles with a thickness of 1 μm or more as an upper layer and/or a lower layer of the layer containing bubbles, and wherein the layer containing bubbles is laminated in two or more layers.

3. The insulated wire according to claim 1, wherein the varnish of the thermosetting resin contains a solvent for the thermosetting resin, a bubble forming agent, and a solvent having a boiling point higher than that of the solvent for the thermosetting resin as a mixed solvent.

4. The insulated wire according to claim 1, wherein the thermosetting resin is a polyamideimide resin.

5. The insulated wire according to claim 1, wherein the thermosetting resin layer containing bubbles contains a thermoplastic resin.

6. An electrical/electronic equipment using the insulated wire according to claim 1, in a coil of a transformer incorporated into the electrical/electronic equipment and/or a motor coil of a rotor.

7. A method of producing an insulated wire, comprising the steps of:

applying a varnish of thermosetting resin on a conductor directly or via an insulating layer interposed therebetween;

baking the varnish of thermosetting resin to generate bubbles during the baking step for this varnish of a thermosetting resin so that the insulated wire has a layer containing bubbles made from the thermosetting resin as an insulating layer, wherein the insulating layer containing bubbles has bubbles of an average size of 10 μm or less, an insulating layer containing no bubbles with a thickness of 1 μm or greater is disposed as an upper layer and/or a lower layer of the insulating layer containing bubbles, and the insulating layer containing bubbles made from the thermosetting resin is laminated in one or more layers.

8. The method of producing an insulated wire according to claim 7, wherein the varnish of thermosetting resin contains a mixed solvent containing a high boiling solvent for bubble formation and a solvent for the thermosetting resin and the high boiling solvent for bubble formation has a boiling point higher than that of the solvent for the thermosetting resin, wherein the high boiling solvent takes the role as both a bubble nucleating agent and a foaming agent when one kind of the high boiling solvent is added to the varnish of a thermosetting resin, and wherein a high boiling solvent acting as the foaming agent and a high boiling solvent acting as the bubble nucleating agent are high boiling solvents different from each other when two or more kinds of the high boiling solvents are used and added to the varnish.

9. The method of producing an insulated wire according to claim 7, wherein the varnish of thermosetting resin is a varnish of thermosetting resin prepared by using a mixed solvent composed of at least three kinds of solvents each having a boiling point of 160° C. or higher.

* * * * *